United States Patent
Ramamurthy et al.

(10) Patent No.: US 6,618,379 B1
(45) Date of Patent: Sep. 9, 2003

(54) RRGS-ROUND-ROBIN GREEDY SCHEDULING FOR INPUT/OUTPUT TERABIT SWITCHES

(75) Inventors: Gopalakrishnan Ramamurthy, Cranbury, NJ (US); Ruixue Fan, Cranbury, NJ (US); Aleksandra Smiljanić, Princeton, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/206,975

(22) Filed: Dec. 8, 1998

(51) Int. Cl.[7] .................................................. H04J 3/00
(52) U.S. Cl. ................................. 370/395.41; 370/458
(58) Field of Search ................................. 370/386, 387, 370/389, 395.1, 395.4, 395.41, 395.42, 395.43, 422, 423, 428, 429, 458, 459, 461, 462, 412, 413, 414, 415, 416, 417, 418

(56) References Cited

U.S. PATENT DOCUMENTS

| | | | |
|---|---|---|---|
| 4,761,780 A | | 8/1988 | Bingham et al. .............. 370/60 |
| 5,161,156 A | * | 11/1992 | Baum et al. ..................... 714/4 |
| 5,299,190 A | | 3/1994 | LaMaire et al. |
| 5,517,495 A | | 5/1996 | Lund et al. |
| 5,982,771 A | * | 11/1999 | Caldara et al. .............. 370/389 |
| 5,982,776 A | * | 11/1999 | Manning et al. ............. 370/414 |
| 6,301,253 B1 | * | 10/2001 | Ichikawa ..................... 370/395 |

FOREIGN PATENT DOCUMENTS

| | | |
|---|---|---|
| JP | 2-87745 | 3/1990 |
| JP | 4-271546 | 9/1992 |
| JP | 7-79352 | 8/1995 |
| JP | 8-23213 | 1/1996 |
| JP | 2805992 | 7/1998 |
| JP | 2000-78148 | 3/2000 |
| JP | 2000-183884 | 6/2000 |

OTHER PUBLICATIONS

Lars Lundbery, "Static Process Allocation Using Information About Program Behavior" Proceedings of the Twenty Fourth Annual Hawaii International Conference on System Sciences, Jan. 1991, pp. 1–9, vol. 1, XP002226104.

Sally A Goldman, et al., "On–Line Scheduling With Hard Deadlines" Algorithms and Data Structures. 5th International Workshop, WADS '97 Proceedings, Proceedings of Workshop in Algorithms and Data Structures, Halifax, NS Canada, Aug. 1997, pp. 258–271, XP002226105.

*Electronics Letters*, vol. 24 No. 13, Jun. 23, 1988, pp. 772–773.

\* cited by examiner

*Primary Examiner*—Kwang Bin Yao
(74) *Attorney, Agent, or Firm*—Sughrue Mion, PLLC

(57) ABSTRACT

A novel protocol for scheduling of packets in high-speed cell based switches is provided. The switch is assumed to use a logical cross-bar fabric with input buffers. The scheduler may be used in optical as well as electronic switches with terabit capacity. The proposed round-robin greedy scheduling (RRGS) achieves optimal scheduling at terabit throughput, using a pipeline technique. The pipeline approach avoids the need for internal speedup of the switching fabric to achieve high utilization. A method for determining a time slot in a N×N crossbar switch for a round robin greedy scheduling protocol, comprising N logical queues corresponding to N output ports, the input for the protocol being a state of all the input-output queues, output of the protocol being a schedule, the method comprising: choosing input corresponding to $i=(constant-k-1) \mod N$, stopping if there are no more inputs, otherwise choosing the next input in a round robin fashion determined by $i=(i+1) \mod N$; choosing an output j such that a pair (i,j) to a set $C=\{(i,j)|$ there is at least one packet from I to j$\}$, if the pair (i,j) exists; removing i from a set of inputs and repeating the steps if the pair (i,j) does not exist; removing i from the set of inputs and j from a set of outputs; and adding the pair (i,j) to the schedule and repeating the steps.

9 Claims, 6 Drawing Sheets

RRGS-ROUND-ROBIN GREEDY SCHEDULING FOR INPUT/OUTPUT TERABIT SWITCHES

I. DESCRIPTION OF THE INVENTION

IA. Field of the Invention

This invention relates to terrabit switches for use in applications like electronic and optical media. Specifically, this invention relates to a round robin greedy scheduling algorithm. This invention is embodied in methods for scheduling and a terrabit switching system that implements the round robin greedy scheduling algorithm.

IB. Background of the Invention

With the growing demand for bandwidth there is an increasing need for terabit switching. see M. Beshai, and E. Miinter, "Multi-tera-bit/s switch based on burst transfer and independent shared buffers," *ICC'95*, pp. 1724–1730, N. McKeown et al., "The tiny tera: a packet switch core," *IEEE Micro*, vol. 171, January–February 1997, pp. 26–33, and W. D. Zhong, Y. Shimazu, M. Tsukuda, and K. Yukimatsu, "A modular Tbit/s TDM-WDM photonic ATM switch using optical buffers," *IEICE Transactions on Communications*, vol. E77-B, no. 2, February 1994, pp. 190–196. Optical switching core (which can be viewed as a logical cross bar switch) with electronic control is an attractive candidate for high capacity switches. At a line rate of 10 Gb/s, a 64 byte cell/packet has to be processed within 40 ns.

An important issue faced by practitioners in the field is how to make fast scheduling decisions that will use the optical core efficiently. Switch design in such a case may involve input buffering, output buffering or both. In a switch with output buffering, the output buffers require access speed greater than the total switch throughput. Alternatively, a knockout architecture is employed in order to decrease the required output buffer speed, where a limited number of cells are accepted by the output buffer and the rest are dropped. An optical knockout switch has been proposed in, Zhong, Y. Shimazu, M. Tsukuda, and K. Yukimatsu, "A modular Tbit/s TDM-WDM photonic ATM switch using optical buffers," *IEICE Transactions on Communications*, vol. E77-B, no. 2, February 1994, pp. 190–196. The complexity of optical knockout switching is high since each output requires several optical reverse Banyan networks and optical buffers.

Switches with input buffering use buffers more efficiently, and need memory bandwidth of only twice the line rate. In a simple scheme with input buffering, all inputs make requests to transmit packets that are at the head of their queues. If two or more inputs make requests for the same output, one of them is chosen randomly. It was shown in, see M. J. Karol, M. G. Hluchyj, and S. P. Morgan, "Input vs. output queuing on a space-division packet switch," *IEEE Transactions on Communications*, vol. COM-35, no. 12, December 1987, pp. 1347–1356 that input buffering algorithm leads to a throughput of 0.587 under uniform traffic condition. The efficiency further decreases in the case of non-uniform traffic. In several other scheduling schemes, packets other than the HOL (head of line) packets contend for output ports. See R. Fan, M. Akiyama, and Y. Tanaka, "An input buffer-type ATM switching using schedule comparison," *Electronics and Communications in Japan: Part I*, vol. 74, no. 11, 1991, pp.17–25; S. Motoyama, D. W. Petr, and V. S. Frost, "Input-queued switch based on a scheduling algorithm," *Electronics Letters*, vol. 31, no. 14, July 1995, pp. 1127–1128; and H. Obara, "Optimum architecture for input queuing ATM switches," *Electronics Letters*, vol. 27, no. 7, March 1991, pp. 555–557. During each time slot, an input issues requests to several outputs. With just 4 requests per time slot, an efficiency approaching 1 is achieved. However, in such a scheme at high speeds multiple request/acknowledgements for scheduling cannot be processed within one time slot (where a slot represents a packet transmission time). Also, for the non-uniform traffic with hot-spots, the performance may degrade since inputs independently decide which outputs they are going to request.

The switch performance can be improved if the switch controller knows the states of all input-output queues. Such information enables the switch controller to increase the number of simultaneous transmissions in each time slot. In the SLIP protocol, the outputs independently issue grants to the inputs, which leads to some inefficiency. see N. McKeown, P. Varaiya, J. Walrand, Scheduling cells in an input-queued switch," *Electronic Letters*, vol. 29, no. 25, December 1993, pp. 2174–2175. Better coordination between inputs is achieved by the algorithms discussed in, see D. Guo, Y. Yemini, Z. Zhang, "Scalable high-speed protocols for WDM optical star networks," *IEEE INFOCOM'94*. However, these algorithms have a disadvantage that they require many time slots to make scheduling decisions.

II. SUMMARY OF THE INVENTION

It is an objective of the present invention to solve the above-mentioned problems in the conventional technologies. Specifically it is an objective of the present invention to provide a method for making scheduling decisions in a terabit switch that will efficiently use the optical core. It is a further objective of the present invention to provide a pipeline architecture that performs a round-robin greedy scheduling while providing good performance and fulfilling stringent timing requirements without internal speedups.

In order to meet the above objectives there is provided a method for determining a time slot in a N×N crossbar switch for a round robin greedy scheduling protocol, comprising N logical queues corresponding to N output ports, the input for the protocol being a state of all the input-output queues, output of the protocol being a schedule, the method comprising: choosing input corresponding to i=(constant−k−1) mod N, stopping if there are no more inputs, otherwise choosing the next input in a round robin fashion determined by i=(i+1)mod N; choosing an output j such that a pair (i,j) to a set C={(i,j)| there is at least one packet from I to j}, if the pair (i,j) exists removing i from the set of inputs and j from a set of outputs; and adding the pair (i,j) to the schedule and repeating the steps; removing i from a set of inputs and repeating the steps if the pair (i,j) does not exist; Another aspect of this invention is a method of scheduling wherein in each time slot N distinct schedules are in progress simultaneously for N distant future time slots, the method comprising; making a specific future time slot available to input for scheduling in a round-robin fashion; selecting an output for a kth time slot in future, by an input i; starting a schedule for the kth time slot in future; determining a next input (I+1) mod N and sending to the next input remaining outputs that are free to receive packets during the kth time slot.

Preferably if an input i is the last input to complete a schedule for the kth time slot, it selects an output (if feasible) and sends a modified output set to a next input; and if the input I completes a schedule for the kth time slot it does not send the output set to the next input.

Still preferably an input that does not receive a modified set of outputs from a previous input starts a new schedule.

Another aspect of the present invention is a method of pipelined round robin greedy scheduling for odd number of inputs wherein an i th time slot is completed using a process comprising: Initializing $k(0,1)=k(1,1)= \ldots k(N-1,1)=0$, const=N+1, wherein, $k(i,I)>0$ is the time slot for which input i reserves an output in Ith time slot, $i_I$=(const−N−1) mod N denotes an input that starts a new schedule in Ith time slot, and $k(i,I)=0$ implies that the action of input i in time slot I is suppressed; setting $O_{I+N=\{O,\ 1,\ \ldots\ ,N-1\}}$, $k(I_I,I)=I+N$, $k(i,I)=k((i-1) \bmod N, I-1)$ for $0 \leq i \leq N-1$ and $i \neq i_I$, choosing one output j at input i, $0 \leq i \leq N-1$, in a round-robin fashion from the set $O_k(i,1)$ for which it has a packet to send, provided that $k(i,I) \neq 0$ and excluding j from $O_{k(i,I)}$; storing the address, at input i, $0 \leq i \leq N-1$, of the chosen output in its connection memory at location $k(i, I) \bmod N$ and moving a head of line (HOL) packet from a corresponding receive input-output queue to separate transmit input-output queue; forwarding the set $O_{k(i,I)}$ at Input i, $0 \leq i \leq N-1$ and $i \neq (i_I-2) \bmod N$, to the next input $(i+1) \bmod N$; establishing a cross bar connection between the input i $0 \leq i \leq N-1$ and output whose address is read from location (I mod (N+1)) of the input i's connection memory; and transmitting the reserved packet at the head of the scheduled transmit input-output queue i through the switch core for each input i, $0 \leq i \leq N-1$.

Preferably multicast scheduling is incorporated in round-robin greedy scheduling algorithm wherein multicast packets are stored in a first come first served fashion and have priority over unicast queues and steps in I th time slot further comprise: choosing all outputs j such that $j \in O_{k(i,1)} \cap BM_i$ at input i, $0 \leq i \leq N-1$ and transmitting HOL multicast packets the chosen outputs in the kth time slot. serving unicast queues if $O_{k(i,I)} \cap BM_i$ is an empty set, otherwise excluding the chosen outputs are from $O_{k(i,I)}$ and $BM_i$; and deleting HOL multicast packets from the multicast queue If $BM_i$ is empty.

Another aspect of the present invention is a method of pipelined round robin greedy scheduling for even number of inputs wherein an Th time slot is completed using a process comprising: initializing $k(0,1)=k(1,1)= \ldots k(N-1,1)=0$, const N+1, wherein, $k(i,l)>0$ is the time slot for which input i reserves an output in lth time slot, $i_l$=(const−N−1) mod N denotes an input that starts a new schedule in lth time slot, and $k(i,I)=0$ implies that the action of input i in time slot 1 is suppressed; setting $O_{I+N}=\{O,1,\ldots,N-1\}$, $k_{(i_l,l)}=l+N+1$, $k(\bmod(i_l+1) \bmod N, l) = k(i_l, I-2)$, and $k(i,l)=k((i-1) \bmod N, I-1)$ for $0 \leq i \leq N-1$ and $(i_1+1) \bmod N\}$ and I is not equal to $I_{l3}$; choosing one output j at input i, $0 \leq i \leq N-1$, in a round-robin fashion from the set Ok(i,l) for which it has a packet to send, provided that $k(i, l) \neq 0$ and excluding j from $O_{k(i,I)}$; storing the address, at input i, $0 \leq i \leq N-1$, of the chosen output in its connection memory at location $k(i, l) \bmod (N+1)$ and moving an HOL packet from a corresponding receive input-output queue to separate transmit input-output queue; forwarding the set $O_{k(i,I)}$ at Input i, $0 \leq i \leq N-1$ and $i=(i_I-2) \bmod N$, to the next input $(i+1) \bmod N$, wherein Input $(i_1-2) \bmod N$ delays the set $O_K((-2) \bmod N,1)$ for one time slot before forwarding it; establishing a cross bar connection between the input i $0 \leq i \leq N-1$ and output whose address is read from location (l mod(N+1)) of the input i's connection memory; transmitting the reserved packet at the head of the scheduled transmit input-output queue is transmitted through the switch core for each input i, $0 \leq i \leq N-1$.

Preferably multicast scheduling is incorporated in round-robin greedy scheduling algorithm wherein multicast packets are stored in a first come first served fashion and have priority over unicast queues and steps in lth time slot further comprise: choosing all outputs j such that $j \in O_{k(i,I)} \cap BM_i$ at input i, $0 \leq i \leq N-1$ and transmitting HOL multicast packets to the chosen outputs in the kth time slot; serving unicast queues if $O_{k(i,I)} \cap BM_i$ is an empty set, otherwise excluding the chosen outputs are from $O_{k(i,I)}$ and $BM_j$; deleting HOL multicast packets from the multicast queue If $BM_i$ is empty.

Another aspect of the present invention is a N stage pipeline system for scheduling a N×N switch where a stage i is associated with an input i, said stage i schedules transmission to an output in a future time slot, said future time slot rippling through all stages, wherein all pipeline stages corresponding to inputs are performing scheduling concurrently such that no two inputs choose a same future time slot at a same time, output slots being selected based on a round-robin fashion, wherein when an output is selected by a stage, the output is removed from a free pool of outputs such that a pipeline stage does not pick the output that has already been selected during a time slot.

III. LIST OF FIGURES

The above objectives and advantages of the present invention will become more apparent by describing in detail preferred embodiments thereof with reference to the attached drawings in which.

IV. DETAILED DESCRIPTION OF THE INVENTION

Figure 1:
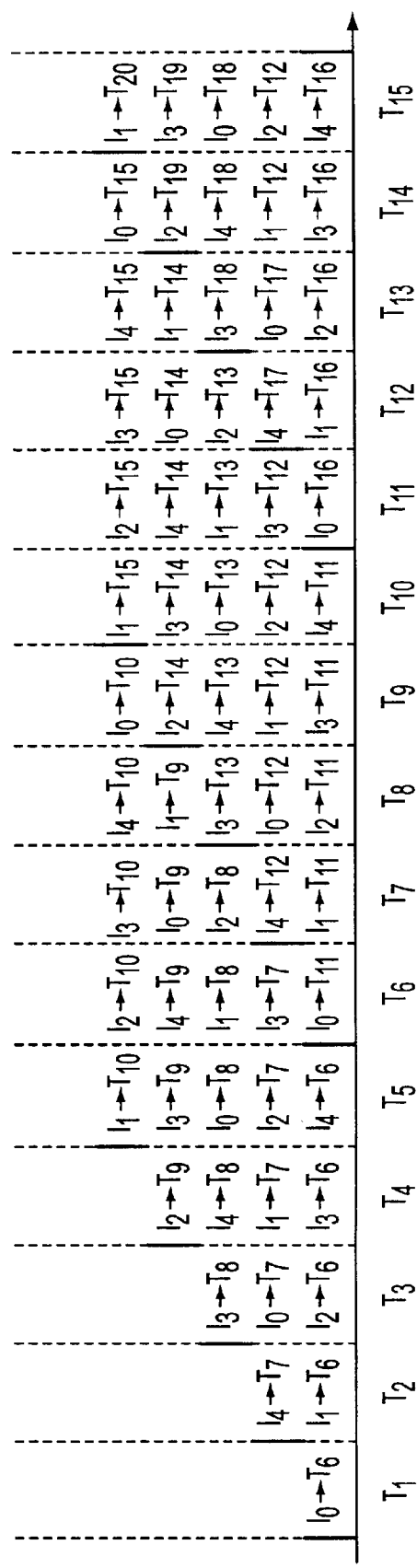
FIG. 1 shows a timing diagram for a preferred embodiment of a switch controller with N=5.

The pipeline architecture according to the present invention performs a "round-robin greedy scheduling" (RRGS). This is a modification of and an improvement over a random greedy scheduling (RGS), see R. Chipalkatti, Z. Zhang, and A. S. Acampora, "Protocols for optical star-coupler network using WDM: performance and complexity study," *IEEE Journal on Selected Areas in Communications,* vol. 11, no. 4, May 1993, pp. 579–589; and D. Guo, Y. Yemini, Z. Zhang, "Scalable high-speed protocols for WDM optical star networks," *IEEE INFOCOM'94*. The protocol of the present invention fulfills stringent timing requirements without any internal speedup, and at the same time preserves the good performance of RGS. see D. Guo, Y. Yemini, Z. Zhang, "Scalable high-speed protocols for WDM optical star networks," *IEEE INFOCOM'94*. It achieves close to 100% utilization, and handles non-uniform traffic equally well.

IV.A Round-Robin Greedy Scheduling (RRGS)

A preferred embodiment is now described in detail. The protocol used in this invention is called a RRGS protocol. Consider an N×N cross-bar switch, where each input port i, $i \in \{0, 1, \ldots, N-1\}$, has N logical queues, corresponding to each of the N outputs. All packets that are received by the switch are fixed size cells. An input to the RRGS protocol is the state of all input-output queues. Such an input can be described by a set C as follows:

C={(i,j)| there is at least one packet at input i for output j}.

The output of the protocol is a schedule associating the inputs to the outputs. Such a set S can be described as follows:

S={(i,j)| packet will be sent from input i to output j}.

It will be clear to a skilled artisan that in each time slot, an input can transmit only one packet, and an output can receive only one packet. Under this condition, a schedule for an arbitrary kth time slot is determined as follows:

Step 1) $I_k = \{0,1,\ldots,N-1\}$ is a set of all inputs, $O_k = \{0,1,\ldots,N-1\}$ is a set of all outputs. Select i = (const—k—1) mod N. Such a choice of an input that starts a schedule will enable a simple implementation.

Step 2) If $I_k$ is empty, stop. Otherwise choose the next input i in a round-robin fashion according to i = (i + 1) mod N.

Step 3) Choose in a round-robin fashion the output j from $O_k$ such that (ij) $\in C_k$. If such an output does not exist then remove i from $I_k$ and go to step 2.

Step 4) Remove input i from $I_k$, and output j from $O_k$. Add (ij) to $S_k$. Go to Step 2.

The above protocol is clearly an improvement over the conventional RGS. See D. Guo, Y. Yemini, Z. Zhang, "Scalable high-speed protocols for WDM optical star networks," *IEEE INFOCOM'94*. Also see the DAS algorithm described in R. Chipalkatti, Z. Zhang, and A. S. Acampora, "Protocols for optical star-coupler network using WDM: performance and complexity study," *IEEE Journal on Selected Areas in Communications*, vol. 11, no. 4, May 1993, pp. 579–589. In the conventional RGS, both input and the corresponding matching output are chosen randomly. However, implementation of such a random selection scheme is difficult in practice. Note that in each time slot, N packets can be transferred from the N inputs to the N outputs.

The process of scheduling a given time slot in RRGS thus consists of N phases. In each phase of a given time slot (in the future), one input chooses one of the remaining outputs for transmission during that time slot. A phase consists of a request from the input module (IM) to the round-robin (RR) arbiter, RR selection, and acknowledgment from the RR arbiter to the IM. The round-robin order in which inputs choose outputs shifts cyclically at each time slot so that it ensures equal access for all inputs.

IV.B Pipelined RRGS for Odd Number of Inputs

At high link speeds (e.g. 10 Gb/s), the N phases cannot be completed within one time slot (40 ns assuming packet size of 64 bytes). With increasing link speeds, using conventional technologies no more than one phase can be completed in one time slot. To overcome this problem, the present invention uses a pipeline approach, where in each time slot, N distinct schedules are in progress simultaneously, for N distinct time slots in the future. Each phase of a particular schedule involves just one input. In any given time slot, other inputs simultaneously perform the phases of schedules for other distinct future time slots.

Definition: A schedule for a future time slot $T_k$ is said to be completed when all N phases are completed, i.e. when all inputs have had a chance to choose (successfully or otherwise) an output for transmission during $T_k$.

While N time slots are required to complete the N phases of a given schedule, N phases of N different schedules may be completed within one time slot using a pipeline approach, by computing the N schedules in parallel. But this is effectively equivalent to the completion of one schedule every time slot. In RRGS, a specific future time slot is made available to the inputs for scheduling in a round-robin fashion. An input i that starts a schedule for the kth time slot (in the future), chooses an output in a round robin (RR) fashion, and sends to the next input (i+1)mod N, the set $O_k$ that indicates the remaining output ports that are still free to receive packets during the kth time slot. Any input i that receives from the previous input (i−1)mod N, set $O_k$ of available outputs for the kth time slot, chooses one output if possible from this set, and sends to the next input (i+1)mod N the modified set $O_k$, if input i did not complete the schedule for the kth time slot, $T_k$. An input i that completes a schedule for the kth time slot should not forward the modified set $O_k$ to the next input (i+1)mod N. Thus input (i+1)mod N which did not receive the set $O_k$ in the current time slot, will be starting a new schedule (for a new time slot) in the next time slot. Step 1 of RRGS implies that an input refrains from forwarding the set $O_k$ once in N time slots. Input i that does not forward the set $O_k$ should be the last one that chooses an output for the kth time slot.

Theorem 1: If input (const−k)mod N refrains from forwarding the set $O_k$ in s the (k−1)th time slot, and the number of inputs N, is odd, then input (const−k)mod N completes the schedule for the kth time slot.

Proof: The above theorem implies that:

In every time slot, all N inputs will have an opportunity to schedule transmission for a future time slot.

In each time slot, an input can schedule a transmission for no more than one future time slot.

In each time slot, an output can be scheduled to receive transmission from only one input.

Fix input i=(const−k)mod N that refrains from forwarding the set $O_k$ in the (k−1)th time slot. In such a case, each of the previous N−1 inputs must forward set $O_k$ when it makes a reservation for the kth time slot. Note that in the (k−1−j) the time slot, an input (i+j)mod N does not forward set $O_l$ to the next input. Also, input (i−j) mod N makes a reservation for the kth time slot. Such a schedule is feasible iff:

$\forall (1 \leq j \leq (N-1)) i-j \neq i+j \bmod N \Leftrightarrow$ $\forall (1 \leq j \leq (N-1)) 2 \cdot j \neq 0 \bmod N \Leftrightarrow$ N is odd number Schedule for the kth time slot was started by the input (i+1) mod N in the (k−N)th time slot, since the input i did not forward set $O_{k-N}$ in the (k−N−1)th time slot.

The timing diagram for an embodiment with a 5×5 switch is shown in FIG. 1. This figure shows the relation between inputs and the time slots for which they are choosing their outputs. For example, in time slot $T_5$, input I is scheduling or choosing an output for transmission during time slot $T_{10}$ while $I_3$ is scheduling for $T_9$ and so on. In the next time slot $T_6$, $I_1$ is scheduling for $T_8$ and so on. A Bold vertical line denotes that the previous input completed a schedule, and the next input will start a new schedule. An input does not forward the set 0 to the next input if it is the last one to choose an output for the associated time slot. Since this condition occurs once per N=5 time slots, an input makes a decision not to forward the set 0, by means of a modulo N counter.

Finally, the actions taken by RRGS in the lth time slot (for example, the current time slot). $O_k$ denotes a set of available outputs for the $R_{th}$ time slot. Let, k(i, l)>0 denote the time slot for which input i reserves an output in the lth time slot, and $i_f$(const−N−1)mod N denotes the input that starts a new schedule in the lth time slot. Also k(i,l)=0 implies that the action of input i in time slot l is suppressed. The scheduler requires proper initialization. This initialization period lasts for N time slots. Assume that the initialization process commences in the first time slot $T_1$. The initialization process is started by setting k(0,1)=k(1, 1)= . . . =k(N−1, 1)=0, const=N+1. That is, the actions of all the inputs are suppressed for the first N time slots, unless modified subsequently. It is also assumed that packets are queued at the input in logically separate queues called input-output queues, with one queue for each output port to prevent HOL blocking. Further, receive input-output queues and transmit input-output queues are also provided.

$O_{l+N}$={0,1, . . . ,N−1} k(i,l)=l+N, and k(i,l)=k((i−1 )mod N,l−1) for 0≦i≦N−1 and i≠il,

Input i, 0≦i≦N−1, chooses one output j in a RR fashion from the set $O_k$(i,l) for which it has a packet to send, provided that k(i, l)≠0. (Input i, 0≦i≦N−1 and i≠≠ i, received $O_{k(i,l)}$ from the input (i−1)mod N in the previous time slot.) Output j is excluded from $O_{k(i,l)}$.

Input i, 0≦i≦N−1, stores the address of the chosen output in its connection memory at location k(i, l)mod N. The head of line packet from the corresponding receive input output queue is moved to the separate transmit input-output queue.

Input i, 0≦i≦N−1, and i≠($i_1$−2)mod N, forwards the set $O_{k(i,l)}$ to the next input (i+1) mod N. Note that just N bits of information need be forwarded.

A cross bar connection is established between the input i, 0≦i≦N−1; and the output whose address is read from location (l mod N) of input i's connection memory.

For each input i, 0≦i≦N−1, the HOL packet of the scheduled transmit input-output queue is transmitted through the switch core.

IV.C Pipelined RRGS for Even Number of Inputs

In the scheme for odd number of inputs, each input refrains from forwarding the modified set $O_k$ to its next neighbor, if the input was the last one to choose an output for a future time slot, and thus completed the schedule for that time slot. A direct application of such an algorithm (developed for an odd value of N), will result in some inputs scheduling for more than one future time slot, while other inputs do not schedule at all. Thus to control a switch with an even number of inputs, the pipeline technique is modified.

Proof of the Theorem 1 infers that delaying instead of blocking the control information would imply even number of inputs. For the case with even number of inputs, each input refrains from forwarding the set $O_f$ to the next input once in N time slots, and, in the next time slot the input forwards the delayed set $O_f$ from the previous time slot. When input i forwards the delayed set 0 it will not forward current set $O_k$. Therefore, input i should be the last one that chooses an output for the kth time slot.

Theorem 2: If input (const−k)mod N delays the set O, in the (k−2)th time slot (and forwards it in the (k−1)th time slot), and the number of inputs N, is even, then input (const k)mod N completes the schedule for the kth time slot.

Proof: Fix the input i (const−k)mod N that delays set Olin the (k−2)th time slot, and forwards the delayed set $0_f$ instead of $O_k$ in the (k−1)th time slot. So, in the (k−1−j)th time slot, input (i+J−1)mod N delays set $O_m$, and input (i+j)mod N forwards delayed set $0_n$. In the (k−1−j)th time slot, input (ij)mod N makes a reservation for the kth time slot and forwards $O_k$ provided that i−j≠i+j mod N and i−j≠i+j−1 mod N which is true for ≦j≦N/2−1 and N even. Input (i−N/2) mod N stores $O_k$ during the (k−1−N/2)th time slot so that no input reserves the kth time slot. In the (k−2−N/2)th time slot, input (i−N/2) makes a reservation for the kth time slot. In the (k−1−j)th time slot, N/2+2≦j≦N, input (i−j+1)mod N makes a reservation for the kth time slot and forwards Ok, provided that i−j+1≠i+j mod N and i−j+1≠i+j−1 mod N which is true for N even.

So, a schedule for the kth time slot progresses through the pipeline without being interrupted before it is completed by user i. This schedule was started by the user (i+1)mod N in the (k−N−1)th time slot, since the input i delayed the control information in the (k−N−2)th time slot.

Figure 2:
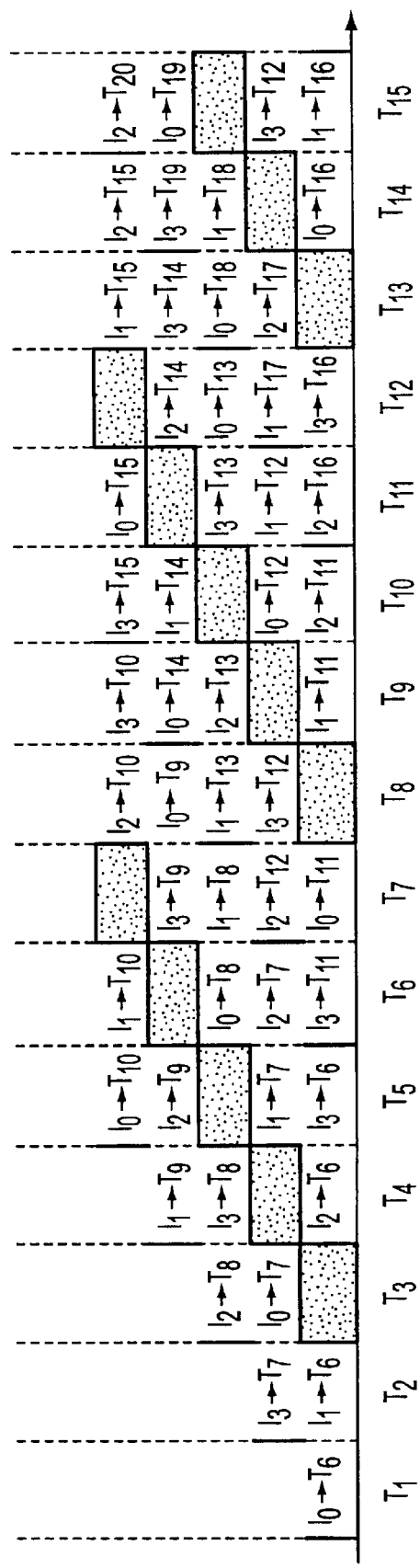
FIG. 2 shows a timing diagram for a preferred embodiment of a switch controller with N=4.

The timing diagram for an embodiment with a 4×4 switch is shown in FIG. 2 to illustrate the case with even number of inputs. Shaded rectangle denotes a delaying of the control information 0. Bold vertical line denotes that the previous input completed a schedule, and the next input will start a new schedule.

Again, the actions that the RRGS takes in the lth time slot for even number of inputs are specified. $O_k$ denotes a set of available outputs for the kth time slot. Let, k(i, l)>0 denote the time slot for which input i reserves an output in the lth time slot, and i−(const−N−1−l)mod N denotes the input that starts a new schedule in the lth time slot. Let k(i, l) 0 imply that the action of input i in time slot (is suppressed. The scheduler requires proper initialization. This initialization period lasts for N time slots. Assume that the initialization process commences in the first time slot $T_1$. The initialization process is started by setting k(0, 1)=k(1, 1)= . . . =k(N−1,1) 0, const=N+2. That is, the actions of all the inputs are suppressed for the first N time slots, unless modified subsequently.

$O_{f+N+j}$={0,1, . . . ,N−1} k(il)=l+N+1, k(mod(i,+1)mod N,l)=k($i_f$−2), and k(i,l)=k ((i−l)mod N,l−1) for 0≦i≦N−1 and i⌐{$1_f$, ($i_f$+1)mod N}.

Input i, 0≦i≦N−1, chooses one output j in a RR fashion from the set $O_{k(i,l)}$ for which it has a packet to send, provided that k(i,l)≠0. (Input i 0≦i≦N−1 and i≠l, received $O_k$ $_{(i,l)}$ from the input (i−1)mod N in the previous time slot.) Output j is excluded from $O_{k(i,l)}$.

Input i, 0≦i≦N−1, stores the address of the chosen output in its connection memory at location k(i, l)mod (N+1). HOL packet from the corresponding receive input-output queue is moved to the separate transmit input-output queue.

Input i, 0≦i≦N−1 and i=($i_f$−2)mod N, forwards the set $O_{k(i,l)}$ to the next input (i+1)mod N. Input ($i_f$−2)mod N delays the set $O_{k(i_f−2)modN,l)}$ for one time slot before forwarding it.

A cross bar connection is established between the input I, 0≦i≦N−1 and the output 4 whose address is read from location (l mod(N+1)) of the input i's connection memory.

For each input i, 0≦i≦N−1, the reserved packet at the head of the scheduled transmit input-output queue is transmitted through the switch core.

IV.D Multicast Scheduling

Another aspect of this invention is the incorporation of a multicast function. Multicast packets are stored in a separate queue which is served in first come first served (FCFS fashion). Each queue has a multicast bit map (BM) which denotes the destinations of its HOL packet. In the simplest version, the multicast queue will have priority over the unicast queues. Additional multicast actions that are taken in the Ith time slot are as follows.

Input i, $0 \leq i \leq N-1$, chooses all outputs j such that j $\epsilon O_{ki,I} \cap BM_i$. HOL multicast packet will be transmitted to the chosen outputs in the kth time slot.

If $O_{ki,I} \cap BM_i$ is an empty set, the unicast queues are served. Otherwise, the chosen outputs are excluded from $O_{k(i,I)}$ and $BM_i$.

If $BM_i$ is empty, the HOL multicast packets is deleted from the multicast queue.

IV.E Implementation of the Switch Controller

Figure 3:
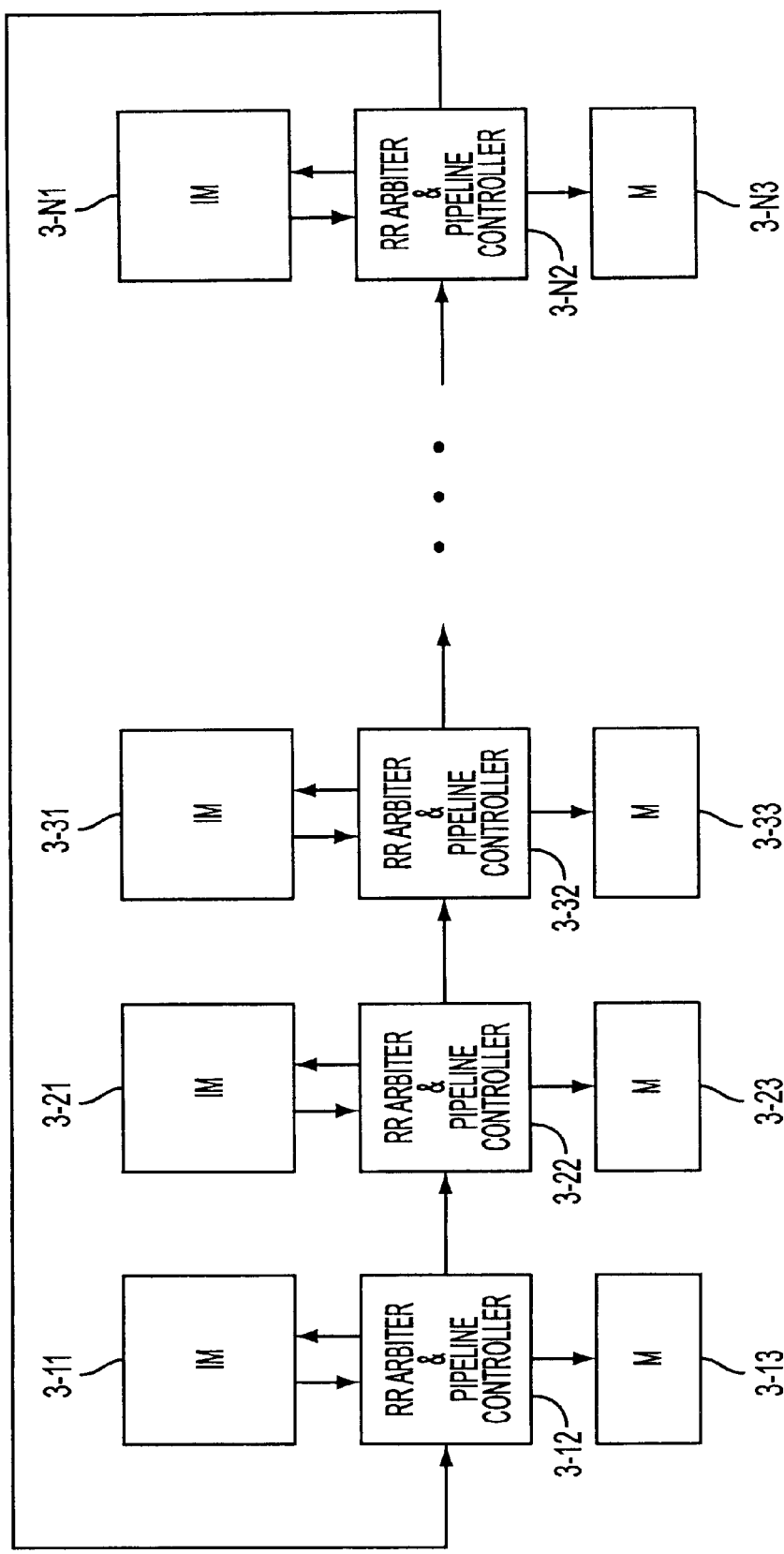
FIG. 3 shows an implementation of a control for a N×N switch.

Controller for an N×N optical cross bar switch is shown in FIG. 3. Each input requires an input module (3.11,3.21, 3.31 . . . 3.N1), a RR arbiter and pipeline controller (3.12, 3.22,3.32 . . . 3.N2), and a connection memory (3.13,3.23, 3.33 . . . 3.N3). The input module (IM) stores incoming packets in logically separate receive queues, with each queue destined for a particular output. The IM sends requests to its associated RR arbiter. The RR arbiter chooses one of the free outputs in a future time slot, and informs the corresponding input and the pipeline controller about this choice. Note that the initialization procedure for the pipeline ensures that in any given time slot, no two arbiters pick the same future time slot for scheduling transmission. The input module stores the successful packet in a separate transmit input-output queue. The RR arbiter also writes its scheduling decision into a specified memory location of the associated connection memory. The location in memory is determined by the time slot for which the packet is scheduled. The pipeline controller informs the RR arbiter of the next input, all the outputs that have not been reserved for a particular time slot; more precisely, it inhibits requests for these reserved outputs. If some input does not forward the control information, its pipeline controller allows the RR arbiter of the next input to be able to choose any output for a future time slot.

Based on the schedule written in the connection memory, packets from the input modules are transferred to output modules via the switch core.

V. PERFORMANCE COMPARISON

In this section, iRRGS is compared with other protocols of similar complexity. Complexity is measured by the time that the protocol requires to complete one schedule. HOL, I-TDMA, SLIP, RGS and RRGS protocols are compared. See K. Boglneni, K. M. Sivilingam, and P. W. Dowd, "Low-complexity multiple access protocols for wavelength-division multiplexed photonic networks," *IEEE Journal on Selected Areas in Communications,* vol. 11, no. 4, May 1993, pp. 590–604; D. Guo, Y. Yemini, Z. Zhang, "Scalable high-speed protocols for WDM optical star networks," *IEEE INFOCOM'94*; M. J. Karol, M. G. Hluchyj, and S. P. Morgan, "Input vs. output queuing on a space-division packet switch," *IEEE Transactions on Communications,* vol. COM-35, no. 12, December 1987, pp. 1347–1356; and N. McKeown, P. Varaiya, J. Walrand, "Scheduling cells in an input-queued switch," *Electronic Letters,* vol. 29, no. 25, December 1993, pp. 2174–2175.

The head of line (HOL) protocol denotes the simplest protocol for the switch with input queuing, see M. J. Karol, M. G. Hluchyj, and S. P. Morgan, "Input vs. output queuing on a space-division packet switch," *IEEE Transactions on Communications,* vol. COM-35, no. 12, December 1987, pp. 1347–1356. Each input sends a request for transmission of the HOL packet, to the appropriate output. The requested output issues a grant to one of the inputs in a round-robin fashion. In the next time slot, the granted inputs send packets to the corresponding outputs.

In interleaved TDMA (I-TDMA) outputs are assigned to the inputs in a fixed manner, see K. Bogineni, K. M. Sivilingam, and P. W. Dowd, "Low-complexity multiple access protocols for wavelength-division multiplexed photonic networks," *IEEE Journal on Selected Areas in Communications,* vol. 11, no. 4, May 1993, pp. 590–604. Time is divided into frames. The transmission schedule is predetermined in each time slot of the frame. Packets are stored in separate queues according to their destinations, and transmitted in their scheduled time slots.

Iterative round-robin matching with slip (SLIP) has been proposed in, see N. McKeown, P. Varaiya, J. Walrand, "Scheduling cells in an input-queued switch," *Electronic Letters,* vol. 29, no. 25, December 1993, pp. 2174–2175. Each input sends requests to all outputs for which it has packets to send. A requested output issues a grant to one of the requesting inputs, in a round-robin fashion. Inputs that receive multiple grants, choose one of the permitted outputs in a round-robin fashion. Each round-robin choice starts from the position after the last chosen candidate.

Random greedy scheduling (RGS) is similar to RRGS except that the round-robin choice is replaced by random choice. see D. Guo, Y. Yemini, Z. Zhang, "Scalable high-speed protocols for WDM optical star networks," *IEEE INFOCOM'94*. The controller randomly chooses a sequence of inputs, and randomly matches them to unmatched outputs. At high speeds, the RGS cannot be completed within one time slot; however, we assess its performance to investigate the effect of replacing the random choice by a round-robin choice.

Figure 4:
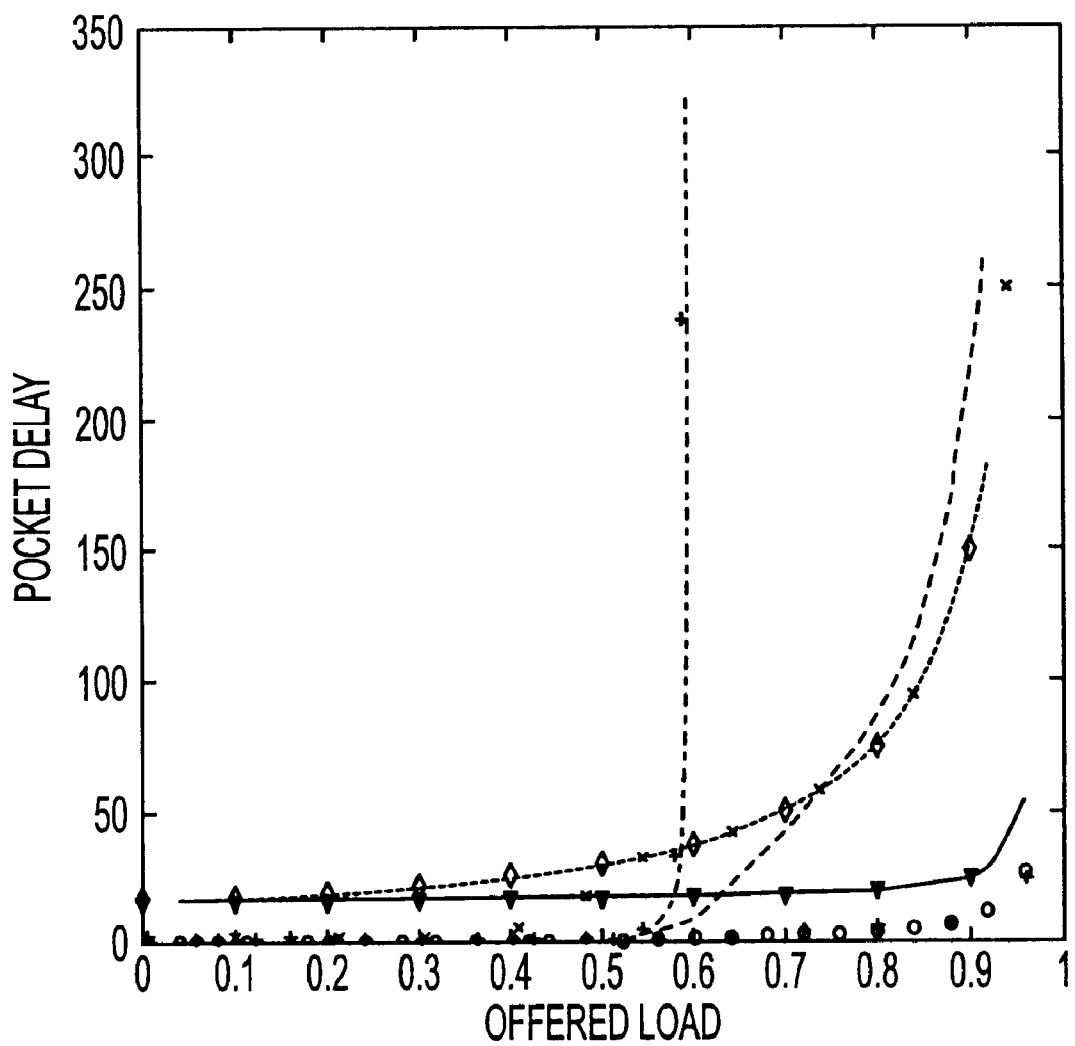
FIG. 4 shows a comparison of average packet delays for an implementation of RRGS, RGS, HOL, SLIP and I-TDMA, based on both analytic and simulation results.

In FIG. 4 the average packet delay versus the offered load for HOL, I-TDMA, SLIP, RGS and RRGS are plotted. The analytical performance results obtained agrees well with simulation results.

Figure 5A:
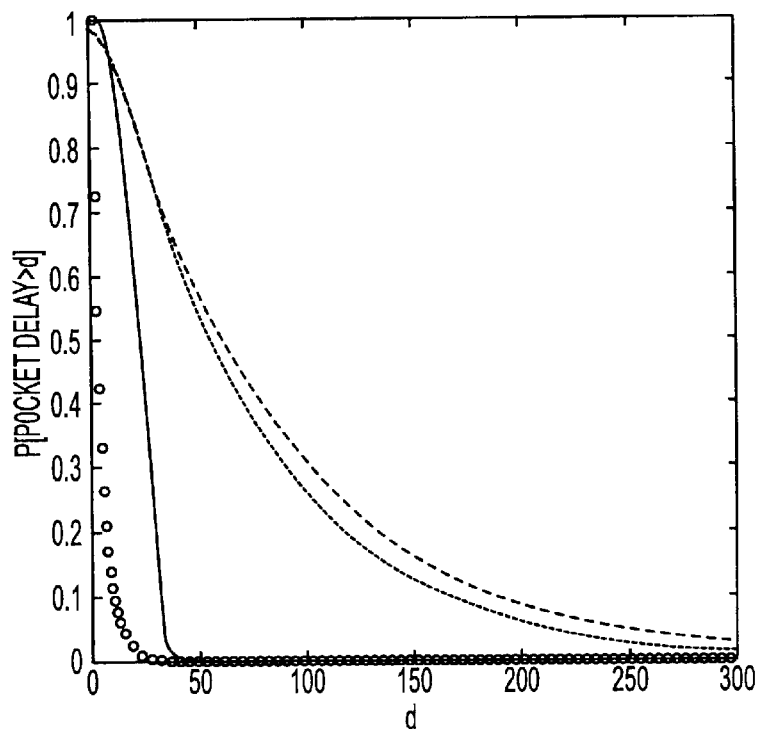
FIG. 5 shows a complimentary distribution function of packet delay in I-TDMA, SLIP, RGS and RRGS for fixed offered traffic load of (a) 0.8 and (b) 0.9 based on simulation results.
Figure 5B:
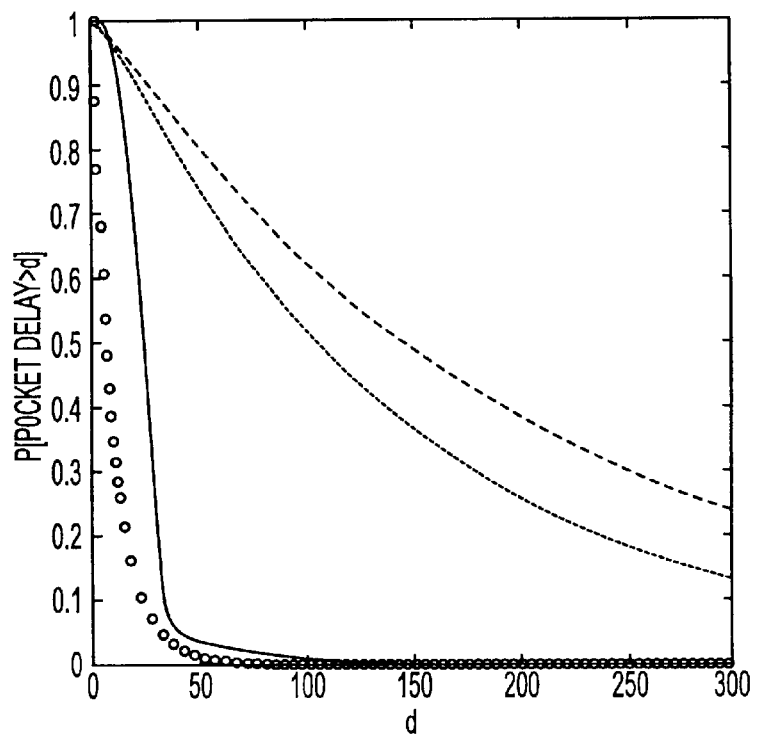
Figure 6A:
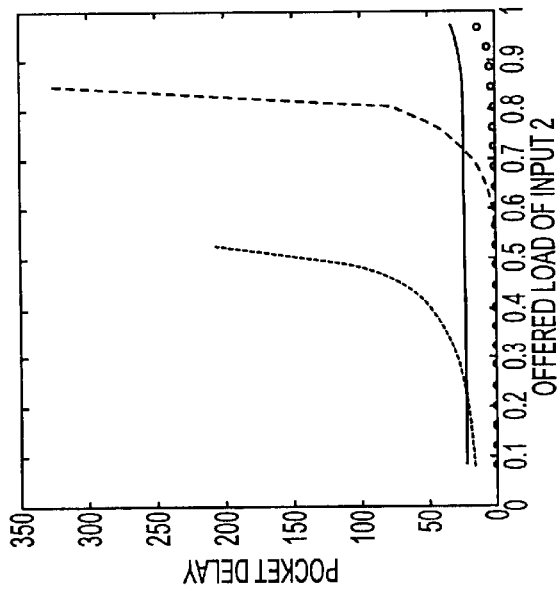
FIG. 6 shows average packet delay under non-uniform traffic load for RRGS, RGS, SLIP and I-TDMA for four groups of queues (a) G1 (b) G2, (c) G3 and (d) overall.
Figure 6B:
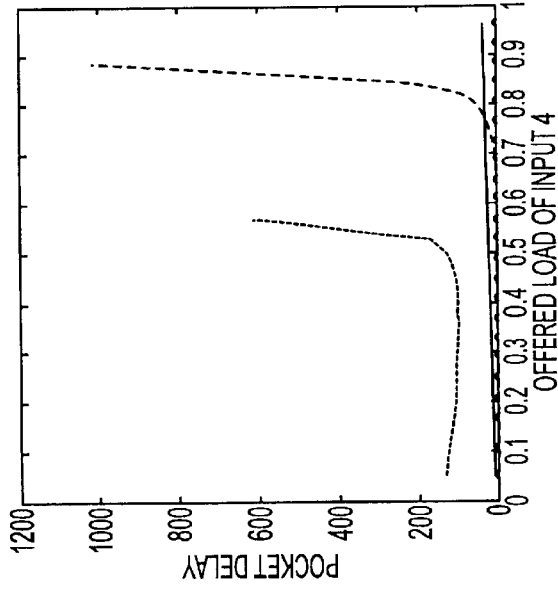
Figure 6C:
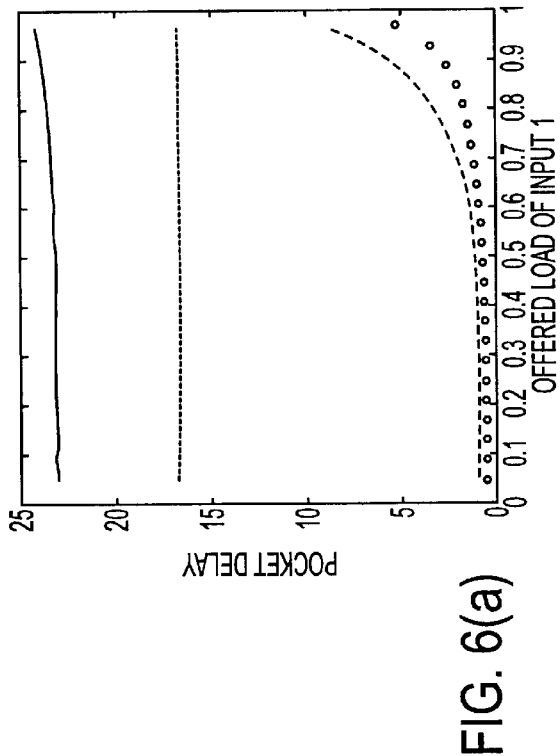
Figure 6D:
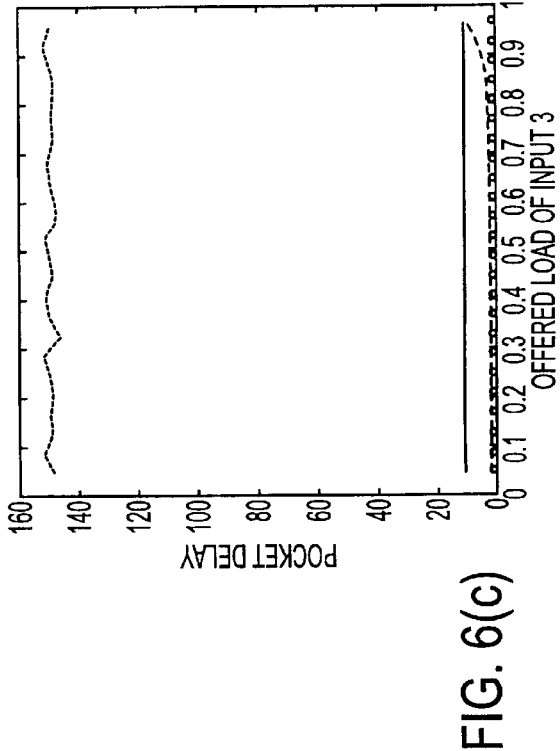

FIG. 5 shows the complementary distribution function of packet delay in I-TDMA, SLIP, RGS and RRGS for fixed offered traffic. The plotted curves are obtained using simulation results. RRGS significantly outperforms I-TDMA and SLIP for most traffic loads.

FIG. 6 shows protocol performance for non-uniform traffic for a specific traffic matrix for four different loads $G_1$, $G_2$, $G_3$ and $G_4$.

VI. CONCLUSION

The present invention proposes a pipelined round robin scheduler for fast input buffered packet switches. The RRGS protocol of the present invention provides shorter average packet delay than other protocols of comparable complexity. Packet delay distribution does not exhibit heavy tail. Under non-uniform traffic loading, lightly loaded queues experience longer delay, but, heavily loaded queues experience delays that are significantly lower, compared to delays in other protocols.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for determining a time slot in a N×N crossbar switch for a round robin greedy scheduling protocol, comprising N logical queues at each input, corresponding to N output ports, the input for the protocol being a state of all the input-output queues, output of the protocol being a schedule, the method comprising:

a) choosing input corresponding to i=(constant−k−1)mod N;

b) stopping if there are no more inputs, otherwise choosing the next input in a round robin fashion determined by i=(i+1)mod N;

c) choosing an output j such that a pair (i,j) to a set C={(i,j)| there is at least one packet from i to j}, if the pair (i,j) exists;

d) removing i from a set of inputs and going to step b if the pair (i,j) does not exist in step c;

e) removing i from the set of inputs and j from a set of outputs; and f) adding the pair (i,j) to the schedule and going to step b, wherein N, I, j and k are natural numbers.

2. A method of scheduling wherein in each time slot N distinct schedules are in progress simultaneously for N distant future time slots, the method comprising;

a) making a specific future time slot available to input for scheduling in a round-robin fashion;

b) selecting an output for a kth time slot in future, by an input i;

c) starting a schedule for the kth time slot in future;

d) determining a next input (i+1) mod N and sending to the next input remaining outputs that are free to receive packets during the kth time slot, wherein N, i, and j are natural numbers.

3. The method of claim 2 wherein if an input i did not complete a schedule for the kth time it slot selects an output and sends a modified output set to a next input and if the input i completes a schedule for the kth time slot it does not send the output set to the next input.

4. The method of claim 3 wherein an input that does not receive a modified set of outputs from a previous input starts a new schedule.

5. A method of pipelined round robin greedy scheduling for odd number of inputs wherein an lth time slot is completed using a process comprising:

a) Initializing $k(0,1)=k(1,1)=\ldots k(N-1,1)=0$, const=N+1, wherein, $k(i,l)>0$ is the time slot for which input i reserves an output in lth time slot, $i_l=(\text{const}-N-1)\text{mod } N$ denotes an input that starts a new schedule in lth time slot, and $k(i,l)=0$ implies that the action of input i in time slot l is suppressed;

b) setting $O_{1+N}=\{0,1,\ldots,N-1\}$, $k(i_l,l)=1+N$, $k(i,l)=k((i-1)\text{mod } N,l-1)$ for $0\leq i\leq N-1$ and $i\neq i_l$;

c) choosing one output j at input i, $0\leq i \leq N-1$, in a round-robin fashion from the set $O_{k(i,l)}$ for which it has a packet to send, provided that $k(i, 1)\neq 0$ and excluding j from $O_{k(i,l)}$;

d) storing the address, at input i, $0\leq i\leq N-1$, of the chosen output in its connection memory at location k(i, l)mod N and moving a head of line (HOL) packet from a corresponding receive input-output queue to separate transmit input-output queue;

e) forwarding the set $O_{k(i,l)}$ at Input i, $0\leq i\leq N-1$ and $i\neq(i_l,2)\text{mod } N$, to the next input (i+1)mod N;

f) establishing a cross bar connection between the input i $0\leq i\leq N-1$ and output whose address is read from location (1 mod(N+1)) of the input i's connection memory; and g) transmitting the reserved packet at the head of the scheduled transmit input-output queue I through the switch core for each input I, $0\leq I\leq N-1$, wherein N, i, j, k are natural numbers and $BM_I$ is a bitmap for a queue that denotes destination of a head of the line packet for a queue i.

6. A method of pipelined round robin greedy scheduling for even number of inputs wherein an ith time slot is completed using a process comprising:

a) Initializing $k(0,1)=k(1,1)=\ldots k(N-1,1)=0$, const=N+1, wherein, $k(I,l)>0$ is the time slot for which input I reserves an output in lth time slot, $l_1=(\text{const}-N-1)\text{mod } N$ denotes an input that starts a new schedule in lth time slot, and $k(I,l)=0$ implies that the action of input I in time slot l is suppressed;

b) setting $O_{l+N}=\{0,1,\ldots,N-1\}$, $k(I_l1)=l+N+1$, $k(\text{mod }(I_l+1)\text{mod } N,l)=k(I_1,l-2)$, and $k(I,l)=k((I-1)\text{mod } N,l-1)$ for $0\leq i\leq N-1$ and $(I_l+1)\text{mod } N)$ and il is not equal to $I_l$;

c) choosing one output j at input I, $0\leq I\leq N-1$, in a round-robin fashion from the set $O_{k(I,l)}$ for which it has a packet to send, provided that $k(I, 1)\neq 0$ and excluding j from $O_{k(I,l)}$;

d) storing the address, at input I, $0\leq I\leq N-1$, of the chosen output in its connection memory at location k(I, l)mod (N+1) and moving an HOL packet from a corresponding receive input-output queue to separate transmit input-output queue;

e) forwarding the set $O_{k(I,l)}$ at Input I, $0\leq I\leq N-1$ and $I=(I_l-2)\text{mod } N$, to the next input (I+1)mod N, wherein Input $(I_l-2)\text{mod } N$ delays the set $O_{k((il-2)\text{mod } N,l)}$ for one time slot before forwarding it;

f) establishing a cross bar connection between the input I, $0\leq I\leq N-1$ and output whose address is read from location (I mod(N+1)) of the input I's connection memory;

g) transmitting the reserved packet at the head of the scheduled transmit input-output queue is transmitted through the switch core for each input I, $0\leq I\leq N-1$, wherein N, i, j, k are natural numbers and $BM_I$ is a bitmap for a queue that denotes destination of a head of the line packet for a queue i.

7. A method according to claim 5 wherein multicast scheduling is incorporated in round-robin greedy scheduling algorithm wherein multicast packets are stored in a first come first served fashion and have priority over unicast queues and steps in lth time slot further comprise:

h) chooses all outputs j such that $j\epsilon O_{k(I,l)}\cap BM_I$ at input I, $0\leq I\leq N-1$ and transmitting HOL multicast packets the chosen outputs in the kth time slot.

i) serving unicast queues if $O_{k(i,l)}\cap BM_i$ is an empty set, otherwise excluding the chosen outputs from $O_{k(i,l)}$ and $BM_i$;

j) deleting HOL multicast packets from the multicast queue If $BM_I$ is empty, wherein N, i, j, k are natural numbers and $BM_I$ is a bitmap for a queue that denotes destination of a head of the line packet for a queue i.

8. A method according to claim 6 wherein multicast scheduling is incorporated in round-robin greedy scheduling algorithm wherein multicast packets are stored in a first come first served fashion and have priority over unicast queues and steps in lth time slot further comprise:

h) choosing all outputs j such that $j \in O_{k(I,l)} \cap BM_I$ at input I, $0 \leq I \leq N-1$;

i) transmitting HOL multicast packets the chosen outputs in the kth time slot;

j) serving unicast queues if $O_{k(i,l)} \cap BM_i$ is an empty set, otherwise excluding the chosen outputs from $O_{k(i,l)}$ and $BM_i$;

k) deleting HOL multicast packets from the multicast queue If $BM_i$ is empty, wherein N, i, j, k are natural numbers and $BM_I$ is a bitmap for a queue that denotes destination of a head of the line packet for a queue i.

9. An N stage pipeline system for scheduling a N×N switch where a stage i is associated with an input I, said stage i schedules transmission to an output in a future time slot, said future time slot rippling through all stages, wherein all pipeline stages corresponding to inputs are performing scheduling concurrently such that no two inputs choose a same future time slot at a same time, output slots being selected based on a round-robin fashion, wherein when an output is selected by a stage, the output is removed from a free pool of outputs such that a pipeline stage does not pick the output that has already been selected, wherein N and i are natural numbers.

* * * * *

UNITED STATES PATENT AND TRADEMARK OFFICE
CERTIFICATE OF CORRECTION

PATENT NO. : 6,618,379 B1
DATED : September 9, 2003
INVENTOR(S) : Gopalakrishnan Ramamurthy and Ruixue Fan It is certified that error appears in the above-identified patent and that said Letters Patent is hereby corrected as shown below:

Column 3,
Line 36, delete "If" insert -- if --

Column 4,
Line 7, delete "If" insert -- if --

Column 5,
Lines 19 and 27, delete "Ok" insert -- $O_k$ --
Line 36, delete "Selccted" insert -- Selected --

Column 6,
Line 45, delete "iff" insert -- if --
Line 60, delete "Bold" insert -- bold --

Column 7,
Line 24, delete "$\neq \neq i$" insert -- $\neq i_\ell$ --

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,618,379 B1
DATED : September 9, 2003
INVENTOR(S) : Gopalakrishnan Ramamurthy and Ruixue Fan It is certified that error appears in the above-identified patent and that said Letters Patent is hereby corrected as shown below:

Column 3,
Line 36, delete "If" insert -- if --.

Column 4,
Line 7, delete "If" insert -- if --.

Column 5,
Lines 19 and 27, delete "Ok" insert -- $O_k$ --.
Line 36, delete "Selccted" insert -- Selected --.

Column 6,
Line 45, delete "iff" insert -- if --.
Line 60, delete "Bold" insert -- bold --.

Column 7,
Line 24, delete "≠≠i" insert -- $\neq i_\ell$ --.
Line 30, after "input" insert -- – --.
Line 66, after "const" insert -- – --.

Column 8,
Line 2, delete "Of" insert -- $O_\ell$ --.
Line 6, delete "(ij)" insert -- (i–j) --.
Line 13, delete "Ok" insert -- $O_k$ --.
Line 31, delete "i-(const-N-1-1)" insert -- $i_\ell$-(const-N-1-$\ell$) --.
Line 33, delete "slot c" insert -- slot $\ell$ --.
Line 42, delete "$O_{f+N+j}$" insert -- $O_{\ell+N+j}$ --.
Line 43, delete "k(il)=l+N+1, k(mod(i,+1) mod N,1)=k(I,-2)" insert -- k($i_\beta$1)=$\ell$+N+1,k (mod($i_\ell$+1) mod N,$\ell$)=k($i_\beta$1-2) --.
Line 49, delete "and i≠1 received" insert -- and i≠$_\beta$ received --.

Column 11,
Line 2, delete "time it slot" insert -- time slot it --.

Column 12,
Line 13, delete "If" insert -- if --.

Column 13,
Line 14, delete "If" insert -- if --.

UNITED STATES PATENT AND TRADEMARK OFFICE
CERTIFICATE OF CORRECTION

PATENT NO. : 6,618,379 B1
DATED : September 9, 2003
INVENTOR(S) : Gopalakrishnan Ramamurthy and Ruixue Fan It is certified that error appears in the above-identified patent and that said Letters Patent is hereby corrected as shown below:

Column 14,
Line 8, after "formula" insert -- (i+1)modN --.

This certificate supersedes Certificate of Correction issued March 30, 2004.

Signed and Sealed this

Twenty-eighth Day of March, 2006

JON W. DUDAS
*Director of the United States Patent and Trademark Office*